Feb. 11, 1941.                E. J. N. BERG                 2,231,405
                          FRUIT CUTTING MACHINE
                          Filed June 13, 1939          2 Sheets-Sheet 1
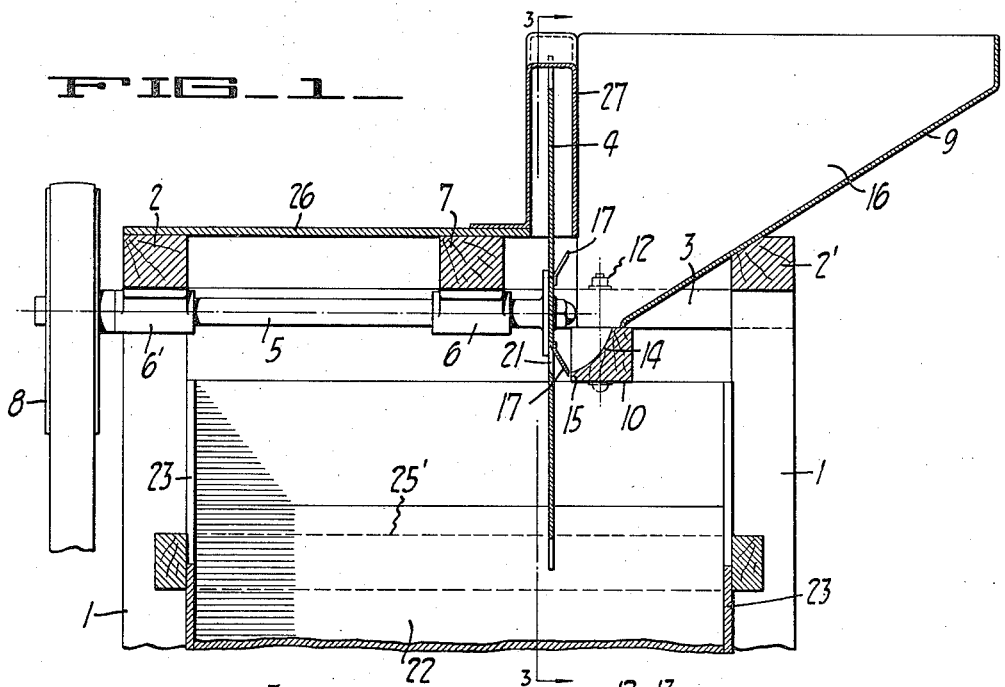
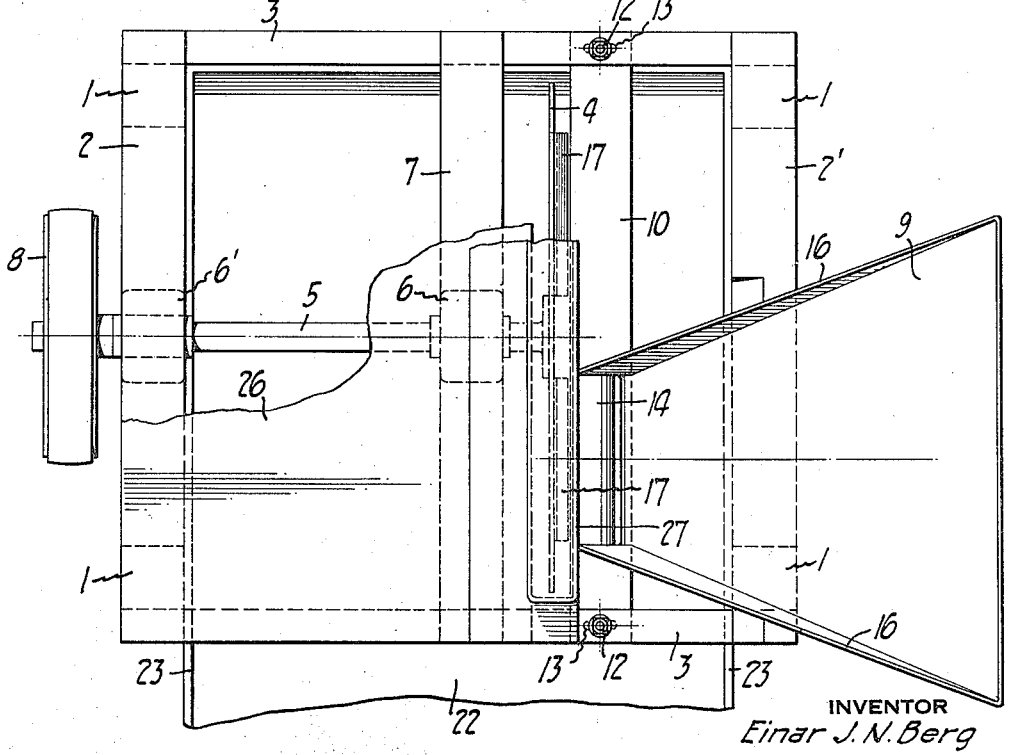
INVENTOR
Einar J. N. Berg
BY
Boyken & Mohler
ATTORNEYS Feb. 11, 1941.  E. J. N. BERG  2,231,405
FRUIT CUTTING MACHINE
Filed June 13, 1939  2 Sheets-Sheet 2
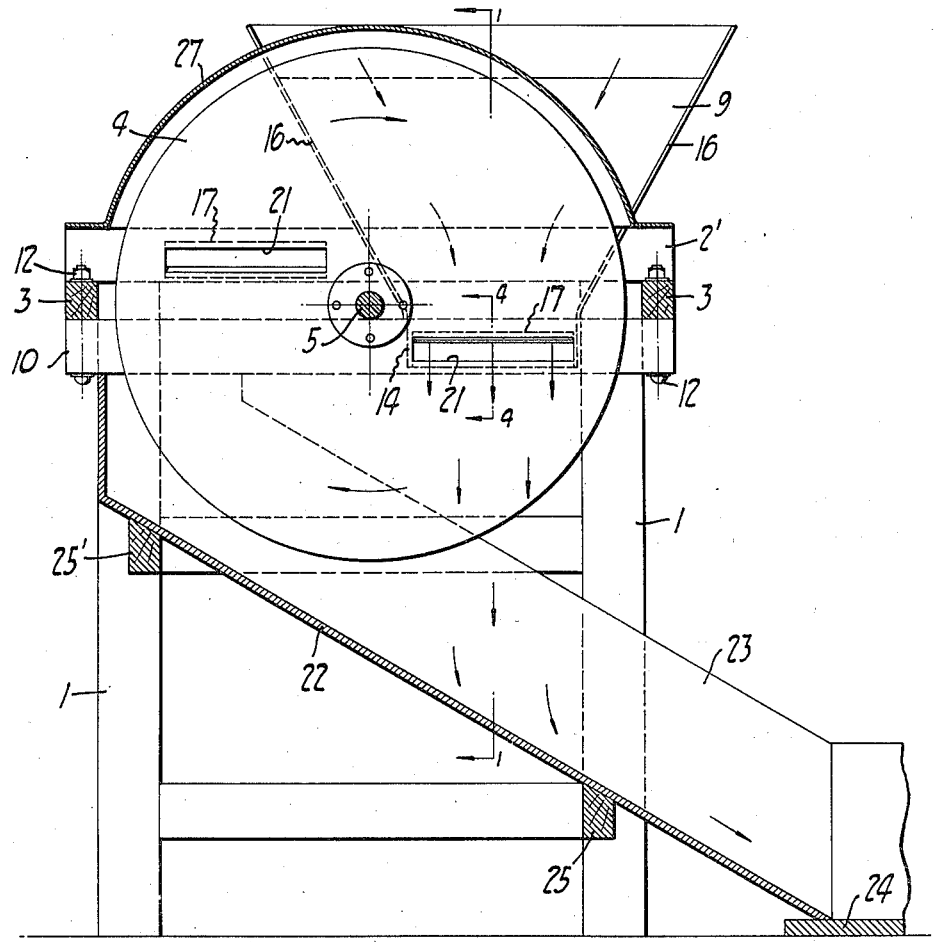
FIG_3_
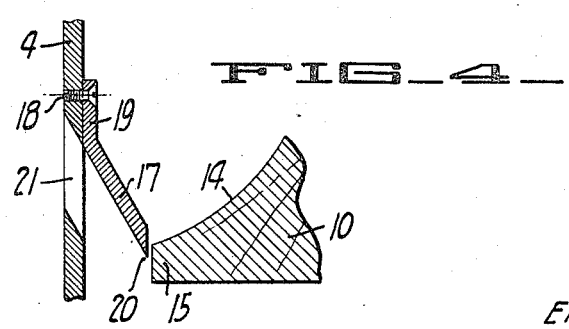
FIG_4_
INVENTOR
Einar J. N. Berg
BY
ATTORNEYS Patented Feb. 11, 1941

2,231,405

UNITED STATES PATENT OFFICE 2,231,405

FRUIT CUTTING MACHINE

Einar J. N. Berg, San Francisco, Calif.

Application June 13, 1939, Serial No. 278,834

2 Claims. (Cl. 146—114)

This invention relates to a fruit-cutting machine and has for its objects an improved machine for rapidly and efficiently cutting fruit, such as whole pears and the like, into slices or slabs of substantially uniform thickness, for subsequent drying of the slices. Another object is the provision of simple means for quickly adjusting the machine to cut fruit into thin or thick slices, or into slices of any desired degree of thickness between thin and thick slices. A still further object is a simple, strong machine for the above purposes, which machine is self-feeding to the fruit cutters, and in which the fruit will remain in position for cutting against accidental dislodgment until each fruit unit is reduced to slices. Other objects and advantages will appear in the annexed description and drawings.

In the drawings,

Fig. 1 is a vertical sectional view through one of the fruit cutting blades, with the legs of the machine broken off to reduce the view to the sheet.

Fig. 2 is a plan view of the machine, with one corner of the feed chute broken off and with the discharge chute broken away in its length.

Fig. 3 is a sectional view taken along line 3—3 of Fig. 1.

Fig. 4 is a sectional view taken along line 4—4 of Fig. 1.

In detail the machine in the drawings comprises four vertical legs 1, two of which at two of the opposite sides of the machine, are connected at their upper ends by horizontal frame members 2, 2' and frame members 3 connect the legs at the remaining two opposite sides, at points adjacent the tops of said legs.

The cutting element, comprises a circular disk 4 secured to one end of a horizontal shaft 5, which shaft is supported for rotation in bearings 6, 6', the bearing 6' being secured to the underside of member 2 and bearing 6 being secured to the underside of a cross member 7 that extends between frame members 3 at a point about intermediate members 2, 2', the disk 4 being positioned between members 7 and 2' so that the axially outwardly facing side of disk 4, with respect to the shaft 5, faces the member 2. The end of shaft 5, opposite the end mounting disk 4, projects outwardly beyond the member 2, and carries a pulley 8, or the like, for rotation of the shaft and disk.

Supported on member 2' is an inclined feed chute 9 having a horizontal fruit retaining element 10 at and below its lower end, said element 10 consists of a horizontally elongated beam parallel with the plane of the disk 4, and adjustably secured at its ends to frame members 3 by means of bolts 12 (Figs. 2, 3), which bolts extend vertically through slots 13 in members 3, the slots extending longitudinally of said members. Thus the cross beam 10 may be moved toward or away from the disk 4 by loosening the nuts on bolts 12, and upon tightening the bolts, the beam 10 is secured in its adjusted position.

The lower end of chute 9 is disposed to one side of and below the axis of said disk, and is of a lesser horizontal width than the radius of the disk, and the portion of beams 10 directly below said lower end, is concavely shaped, as at 14 (Fig. 1) on its side facing toward, and generally upwardly, with respect to the side of disk 4 adjacent thereto. Thus, a lip 15 is formed on the beam, which lip is nearest the disk 4 and the side of the beam above the lip is curved, and terminates adjacent the upper side of the beam 10 remote from the lip and from the disk. From the ends of the concave face 14, the sides 16 of the chute 9 extend divergently to the outer end of the chute.

It will be seen from the foregoing that fruit dumped onto chute 9 will roll down the chute and against the side of disk 4 facing the chute, and will be held in a sort of pocket, the lateral sides of which are disk 4 and the concave side of beam 10, with the lip 15 forming the bottom of the pocket.

On the side of disk 4 facing the chute, are a pair of straight, elongated cutting blades 17, one of which cutting blades is disposed on one side of the central axis of the disk while the other is at the opposite side of said axis. Each of said blades is disposed generally tangentially of a relatively small circle concentric with the central axis of the disk, and the length of each blade is preferably not less than the horizontal width of the lower end of the chute 9. The disposition of blades 17 is such that the blades, during rotation of the disk, will be parallel with beam 10, when said blades pass the beam.

Blades 17 in cross-section, slantingly project outwardly of the side of disk 4 adjacent said chute and are removably secured to said side of the disk by screws 18 which pass through an angular extension 19 of said blades, formed integrally with the blades, respectively, and into the disk 4. The extension 19 is along one longitudinal edge of each blade and lies flat against the outer side of the disk, while the opposite outer free edge of each blade is sharpened as at 20, (Fig. 4). The blades are preferably disposed in a plane extending between 30° and 45° with respect to the plane of the disk, and the cutting edge 20 of each blade is therefore equally spaced from the side of disk 4 adjacent thereto and the distance of said cutting edge and the disk, determines the thickness of the slices to be cut.

Behind each blade 17 the disk 4 is slotted at 21, each slot being the length of the blade 17 and of substantially the same size as each blade with the opposite longitudinal edges of the slots being slanted similar to the slant of the blade adjacent thereto. Each blade 17 substantially covers each slot, and as the cutting edges 20 of the blades face in the same direction with respect to the direction of rotation of blade 4 (Fig. 3), it will be seen that the fruit bodies, such as pears, supported against the concave face 14 of beam 10 will be successively sliced by the blades as they are revolved about the axis of shaft 5, with the slices passing through the slots 21.

The slices of fruit passing through slots 21 will drop onto a discharge chute 22, which chute 22 has sides 23, and is inclined downwardly relative to disk 4, below which the bottom of the chute passes. The lower end of chute 22 discharges cut slices onto a horizontal platform 24 at the lower end of the latter and cross-members 25, 25', respectively, carry the chute, the former cross-beam being adjacent the lower end of the chute 22 and the beam 25' being adjacent the upper end thereof. The lower end of the chute 22 may discharge directly onto the ground or floor, or platform 24, from which the cut fruit may be shoveled into boxes or into trays or directly onto a drying field.

In operation, the disk 4 is rotated at say about 200 revolutions per minute, and boxes of pears or the like are dumped into chute 9. The pears will roll down onto the concave side 14 of the fruit retaining member 10 and will automatically be held, by gravity, against the adjacent side of disk 4, and as the blades 17 on said disk pass said member 10, the pears will be reduced to slices, the slices passing through the slots 21 in said disk and onto chute 22 for sliding downwardly in the latter for removal from the lower end thereof. A cover 26 extends over the chute 22 and also a housing 27 encloses the upper half of disk 4, above the beam 10.

The provision of the supporting lip 15 and concave side 14 of the fruit retaining member 10 is particularly important, since it prevents the tendency of the fruit to bounce away from the disk 4 and blades, thus insuring a positive and uniform cutting of the fruit and as the blades 17 finish slicing the pears supported on said lip, the remaining pears on chute 9 are automatically fed to the disk for cutting.

Thus the member 10, as described, functions as a stationary fruit retaining member supporting the fruit against accidental displacement relative to disk 4 during cutting thereof and said member supports the fruit by gravity for automatic feeding thereof to said disk and blades while being held against displacement relative thereto.

The volume of pears handled by a machine of any given dimensions may be increased or decreased by varying the dimensions, since longer cutting blades will obviously cut more than shorter blades.

This machine is used generally for cutting fruit and the like for stock feed, the fruit being dried after cutting, and then the moisture restored by adding water thereto, before being fed to stock. Obviously, in order to be practical for this purpose, it is essential that the machine be economical to make and use, and that it be capable of cutting a large volume of fruit per hour. In a machine of the type described, and with about eight or ten inch cutting blades, the machine will cut the fruit into slices faster than an operator can shovel the fruit away from the discharge chute, and the fruit is reduced to slices of substantially uniform thickness so as to dry evenly and thoroughly.

I claim:

1. A fruit slicing machine comprising a supporting frame, a vertically disposed circular disk centrally mounted on said frame for rotation about its horizontal axis, means for rotating said knife in one direction, an upwardly inclined fruit feeding chute rigidly secured on said frame, said chute being open at its lower end and said open lower end being positioned at one side of said central axis and adjacent, but spaced from one side of said disk, and extending upwardly from said lower end in a plane perpendicularly to the plane of the disk whereby fruit fed onto said chute will be discharged from said lower open end against said one side of the disk, a fruit cutting blade on said one side of said disk having a cutting edge spaced from said one side and positioned to slice fruit discharged from said chute against said one side, a fruit supporting member disposed below said lower open end of the chute and extending toward said one side of said disk for receiving fruit from said chute and for supporting said fruit during slicing by the said cutting blade when the said disk is rotated in said one direction, means mounting said member for movement toward and away from said disk for adjusting its position, means securing said member rigidly relative to said chute when in adjusted position, and means removably securing said blade to said disk for permitting substitution of blades of different sizes.

2. In a construction as defined in claim 1, the said member being formed with a concave side facing in a direction generally upwardly and toward said disk and positioned for receiving thereon fruit from said lower open end of said chute and for holding such fruit against the tendency of said fruit to be dislodged in direction away from said disk and blade during cutting by said blade.

EINAR J. N. BERG.